Patented Apr. 13, 1954

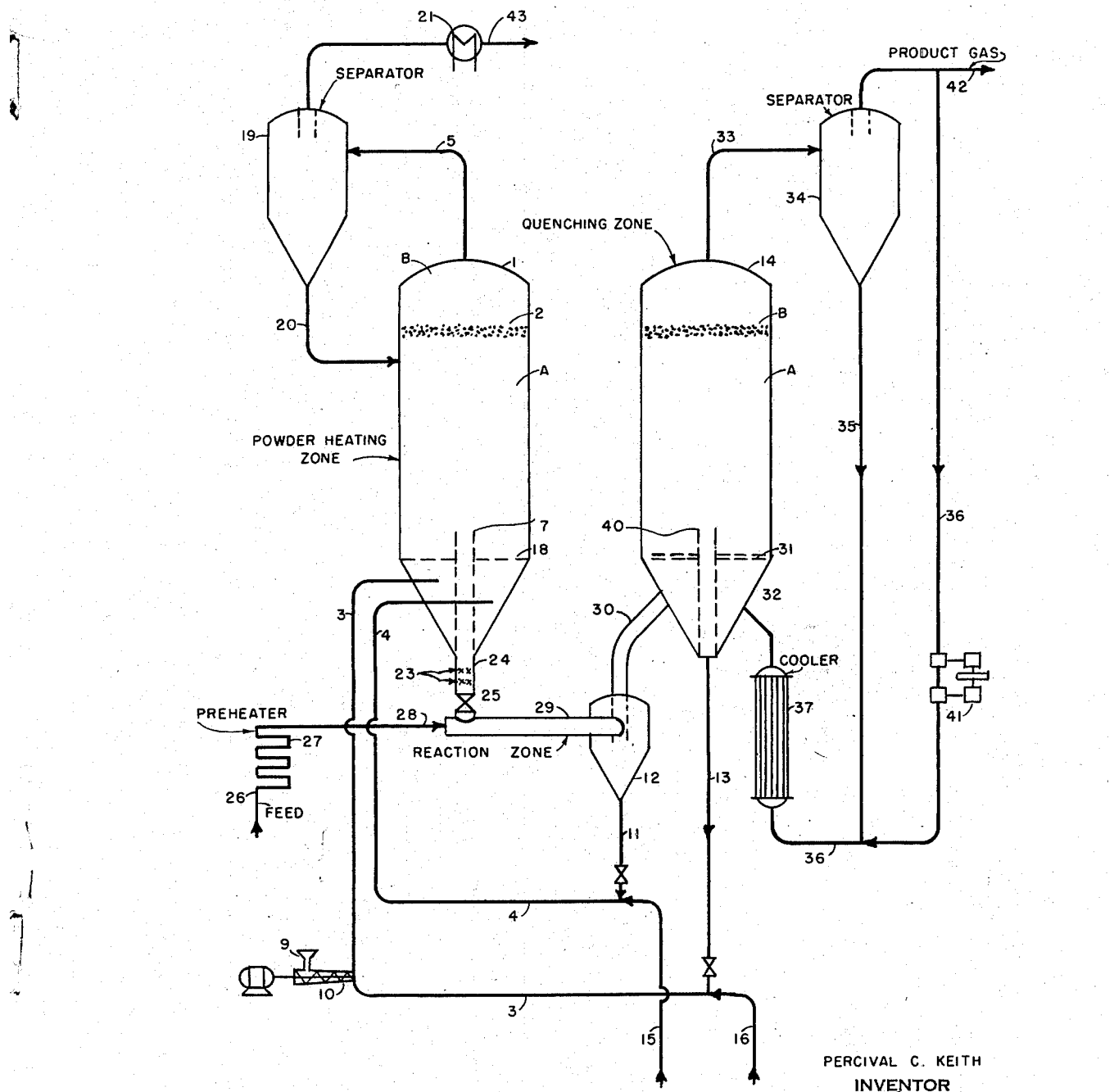

2,675,294

UNITED STATES PATENT OFFICE 2,675,294

METHOD OF EFFECTING CHEMICAL CONVERSIONS

Percival C. Keith, Peapack, N. J., assignor to The M. W. Kellogg Co., Jersey City, N. J., a corporation of Delaware Continuation of application Serial No. 684,684, July 19, 1946. This application August 16, 1949, Serial No. 110,541

6 Claims. (Cl. 23—1)

The present invention relates to improvements in process, and apparatus, for effecting chemical conversion reactions, particularly, those conversion reactions requiring for their satisfactory practice the supplying of and/or withdrawing heat to or from a gaseous reactant in a very short period of time.

This application is a continuation of my application Serial No. 684,684, filed July 19, 1946, which in itself is a continuation-in-part of my application S. N. 429,266, filed February 2, 1942.

Heretofore, certain conversion reactions have been known and practiced on a very small scale and with laboratory equipment, but since they were not amenable to satisfactory practice on large scale apparatus and under commercial conditions, have remained merely of academic interest. This type of conversion reaction, in general, consists of those requiring that a gaseous reactant or reactants be brought up to an elevated temperature in a very short period of time and, in many instances, likewise maintained at this temperature for a very short period. The provision of a method and apparatus whereby such conversion reactions may be carried out with satisfactory yields of the desired products on a large commercially feasible scale, and with commercially available apparatus, constitutes a primary object of my invention.

A further object of my invention is the provision of method and apparatus whereby endothermic chemical conversion reactions requiring the maintenance of a reactant, or reactants, at specified temperatures for an extremely short period of time may be satisfactorily accomplished and which are not subject to the limitations entailed by the supplying of the necessary heat largely or entirely by means of indirect heat exchange.

Pursuant to the present invention a stream of the gaseous reactant is mixed with heated particles of a solid contact material, the particles thus added serving as a heat carrier and being at a temperature and in sufficient amount to substantially instantaneously heat the gaseous reactant to and maintaining it at the required conversion temperature.

A further feature of the process comprises quickly cooling the stream of conversion products to a temperature level at which undesired reactions are precluded, by passing them to a suitable cooling or quenching zone, this zone preferably comprising a cooled "psuedo-liquid" mass of the particles of contact material.

Various other features, advantages and objects of my invention will be apparent from the following detailed description thereof given in connection with the appended drawing.

The appended drawing illustrates diagrammatically a suitable arrangement of apparatus, and process flow, for the practice of the invention pursuant to one illustrative embodiment. As shown therein, the process may suitably involve three primary units or zones, comprising a powder heating zone wherein the particles of solid contact material are preheated to a suitable temperature, a conversion or reaction zone wherein the solid particles are suspended in and contacted with a stream of the gaseous reactant for the requisite short period of time, and a cooling or quenching zone wherein the temperature of the conversion products is rapidly lowered to a desired level.

The particles of solid contact material may be preheated to the required temperature for introduction into the reaction zone by any one of various available heating methods such as by heating in a rotary kiln, or the like. However, a preferred procedure as shown in the drawing consists in heating these particles under conditions wherein they constitute a "pseudo-liquid" or "fluidized" bed, hereafter referred to as dense phase zone. This particular condition in general is characterized by the relatively high concentration of the particles of solid contact agent measured in terms of the quantity thereof per unit volume of occupied space, and by the maintained low velocity flow of heating gas upwardly through the zone. The maintenance of a definite minimum gaseous velocity is regarded as desirable to maintain the bed in a turbulent fluidized state. Preferably, the upward velocity of the gas through the heating zone is sufficiently high to maintain the dense phase of solid particles in a turbulent condition whereby the individual particles are caused to circulate throughout the dense phase zone. This turbulent and circulatory motion of the solid particles results in the maintenance of a substantially uniform temperature throughout the dense phase. The optimum velocity both with respect to its minimum and maximum value will be dependent upon the density, size and shape of the solid particles employed and the density and viscosity of the heating gas, so that for any particular size or sizes of particles and quality of heating gas this velocity is adjusted within a range so as to maintain the desired turbulent dense phase condition. For example, employing a powdered contact material consisting of a range of mixed size particles, all or most of which are smaller than 100 microns, and operating at atmospheric pressure with gases consisting essentially of air admixed with combustion products, a gas velocity within the range of 1.5 to 2 ft. per second is regarded as suitable.

Powdered solid material of this character in its ordinary "non-aerated" state will exhibit a definite angle of repose characteristic of a finely divided solid. For example, a powdered material of given physical characteristics when poured on to a horizontal supporting surface in such manner as to form cones of the powder will produce cones of equivalent inclinations to the horizontal, that is equal "angles of repose" regardless of the relative heights of the individual cones. Accordingly, a definite angle of repose on pouring into an unconfined space is an inherent characteristic of non-aerated finely divided powdered solids. Due to their high specific surface powdered solids may be aerated in such a manner that a film of the aerating fluid is produced on the surface thereof with the result that the individual particles will flow readily with respect to the adjacent particles, and accordingly, these particles behave in the same characteristic manner as the particles constituting a liquid. For example, these aerated particles no longer exhibit a definite angle of repose and flow similarly to a liquid. The solid particles in this aerated condition may, therefore, be described as being "pseudo-liquid" or as being in the form of a "solid-emulsion," one component or phase of which is made up of the solid particles and the second component or continuous phase consisting of the air or other gaseous films.

The dense pseudo-liquid phase of the particles of solid contact material (zone A) extends only partially through the powder heating zone or heater 1, an approximate upper horizontal level thereof being indicated by dotted line 2. The space (zone B) in the reactor above this level constitutes a solid-vapor disengaging space, accordingly only a relatively small proportion of the total quantity of contact material introduced through lines 3 and 4 is carried out overhead with the heating gases leaving zone B through gas outlet line 5. Heated contact material preferably is withdrawn from the heating zone by a withdrawal passageway 7 opening directly into the dense phase zone A.

Particles of solid contact material may be supplied initially to the system through hopper 9 and by a screw conveyor or solids-pump 10 to inlet line 3 leading to the base of the powder heater 1. Solids-pump 10 may be of a suitable design to introduce the powdered material under an opposing fluid pressure, for example, a solids-pump of the "Fuller Kinyon" type such as described in Kinyon Patent 1,553,539. During normal operation the main amount of contact material circulated is derived by recycling from subsequent portions of the system, and only "make up" material, to compensate for unavoidable losses or the like, is supplied from hopper 9.

Recirculated or recycled particles of contact material are introduced to inlet lines 3 and 4, respectively, from discharge line 11 of the primary separator 12, and discharge line 13 from the base of the cooler or quencher 14. A suitable conveying gas is supplied to the inlets of lines 3 and 4 through lines 15 and 16 and the conveying medium thus supplied may suitably be a portion or all of the heating gas utilized in zone 1 to heat the contact material to the required temperature. For example, a fuel gas may be supplied through line 15 and an oxygen-containing gas such as air supplied through line 16. The suspensions of the particles of contact material and conveying medium are carried through lines 3 and 4 to the conical base 17 which serves as a distributor for zone 1, the lower boundary of the dense phase zone A being approximately defined by the upper boundary of the cone 17 as indicated by dotted line 18. When required, additional combustible gas and/or air may be introduced into distributing cone 17 from inlets therein, not shown, or at any other desired points throughout the length of the dense phase zone. The cross sectional area of zone 1 is so proportioned with respect to the quantity of gas introduced that the upward velocity of the gas therethrough is relatively low and adapted to provide the dense pseudo-liquid phase hereinbefore described.

The temperature of the solid particles recycled through lines 3 and 4 usually will be sufficient to start combustion of the combustible gas in zone A. Zone A serves not only as a heating zone but also as a zone for removal of any undesirable constituents such as carbonaceous material deposited on the contact material during conversion, and also utilizes such deposits as fuel in the heating operation.

Flue gas is withdrawn overhead from the gas-solids disengaging space B through line 5 and passed to a suitable separating system such as a cyclone separator or separators 19 wherein suspended solids are separated and returned to the system, suitably through line 20 leading back to the dense phase zone A. The hot flue gas discharged from separator 19 is suitably passed through a heat exchanger or waste heat boiler 21 for the recovery of its heat content and is then discharged from the system, either through pressure control equipment or vacuum pumps (not shown) depending on the desirability of operating zone 1 at pressures above or below atmospheric pressure.

Heated particles of solids contact material are withdrawn from the dense phase zone A through an outlet pipe 7 opening directly into this phase. In certain instances a stripping and aerating gas may be introduced into pipe 7 through lines 23 for the purpose of displacing any gases entrained therewith which would be undesirable in the subsequent reaction, and maintaining the withdrawn material in standpipes 24 in a flowable pseudo-liquid condition.

From outlet 7, the hot particles of contact material are passed to the reaction zone through standpipe line 24 at a rate controlled by valve 25. The pressure at valve 25 is approximately the sum of the pressure at 43, the fluid pressure in zone B, the static head of zone A and the static head of fluidized particles in the outlet standpipe 24. The height of standpipe 24 may be suitably dimensioned to provide any desired pressure at its discharge opening and hence its height will be varied depending upon the back pressure upon this opening from the reaction zone.

A suitable feed is supplied to the system through line 26 and is preferably preheated in heating coil 27 to a temperature approximating but below that at which undesired reactions would occur. The preheated feed is then introduced into the reaction or conversion zone through line 28.

In the initial part of the reaction zone, the vaporized feed or gaseous reactant mixes with the stream of hot particles of contact material introduced through line 24, and the gaseous suspension thus produced is carried at a high velocity through the reaction zone consisting of chamber 29 and the upper section of primary separator 12. The temperature of the material introduced through line 24 and the quantity thereof is such as to heat the gaseous reactant (or reactants) to and maintain it substantially at the required reaction temperature during the passage of the reactant and suspended particles through the reaction zone. Due to the rapid intimate contact between the particles and the gaseous reactant, and the large amount of heat exchange surface thus made available, the temperature of the gaseous reactant is raised to the required reaction temperature substantially instantaneously and undesirable reactions occurring at intervening temperatures are thereby reduced to a minimum.

From reaction zone 29 the suspension is preferably passed to a suitable separator adapted to separate a portion of the suspended solids at a high velocity and consequent relatively short interval of time, for example, a gas-solids separator 12 of the cyclone type. The gas space in separator 12, which operates at reaction temperature, constitutes a part of the total reaction zone. Solids separated in separator 12 are withdrawn from its bottom hopper through line 11, and returned through line 4 to zone 1. Gaseous conversion products and remaining suspended solids particles are withdrawn from the top of the separator through line 30 and passed to a cooling or quenching zone 14.

The length of the conversion chamber and the dimensions of the primary separator are so selected that the time required for the gaseous reactant to pass therethrough is of the required short duration. The specific purpose of primary separator 12 is to recycle at the highest possible temperature a large quantity of the solid particles for the sake of heat economy. Of necessity, this type of apparatus which operates substantially at the reaction temperature, provides additional reaction time to the time provided in the reaction zone. In the case of certain reactions which may advantageously be carried out by the process herein disclosed, the maximum allowable reaction time is of such short duration that it precludes the use of a primary separator. In these cases I prefer to operate without the primary separator 12, that is, the efflux from the reaction zone flows directly into line 30. On the other hand certain other reactions are encountered requiring that the gaseous reactant be maintained at an elevated temperature over a fairly long period of time. In such cases the process may be advantageously modified by utilizing an arrangement similar to that shown except that primary separator 12 may be constructed to contain a "fluidized" bed maintained at substantially reaction temperature.

Various means may be provided for quickly cooling the conversion products discharged through line 30 to a temperature level at which undesirable reactions are inhibited, such as a liquid quenching bath, liquid spray, or the like. However, an arrangement greatly preferred is that shown wherein the cooling zone comprises a body of the particles of contact material in a turbulent fluidized or pseudo-liquid condition similar to the preferred condition maintained in the powder heating zone 1, and governed by the same factors but maintained at the lower temperature to which the reaction products must be rapidly cooled. In order to provide this condition cooler 14 is made of a suitable cross sectional area such that the gaseous conversion products discharged thereto through line 30 travel upwardly through the cooler at a relatively low velocity adapted to provide the desired turbulent pseudo-liquid phase. A perforated plate or other suitable means 31 may be provided at the upper portion of the distributing cone 32 to insure an even distribution of the gas introduced through line 30. Zones A' and B' in cooling zone 14 correspond to zones A and B in heating zone 1. The pseudo-liquid phase A' may be cooled by any suitable means such as cooling coils disposed directly therein. A preferred method for cooling zone A', as shown, consists in withdrawing solid particles therefrom and recycling these through an external cooling zone and then back to zone A' through the circuit constituted by elements 33, 34, 35, 36 and 37. Due to the highly turbulent movement of the solid particles maintained in zone A' the cooled particles thus recycled are quickly distributed throughout zone A' and a substantially uniform low temperature is thereby maintained.

From zone 14, gaseous conversion products and residual suspended solid particles are withdrawn overhead and passed to a suitable separating system such as a low velocity settler, or optionally a cyclone separator or separators 34 wherein substantially complete separation of the suspended solids is effected. The gaseous conversion products are forwarded through line 42 to a suitable conventional products recovery means or system, such as an absorber, or the like. The pressure in line 42 may be maintained above or below atmospheric pressure by suitable equipment as in the case of line 43.

The solids withdrawn from separator 34 may suitably constitute those recycled through the external cooling zone 37 for the purpose of temperature control in zone 14. These particles are preferably suspended in a portion of the product gas by-passed through line 36 by compressor 41 and returned to the dense phase zone $A_1$ by way of line 36 and through the cooler or heat exchanger 37.

All the solid particles in suspension in the gas passing through line 30 are eventually recirculated to the powder heating zone by withdrawing them through outlet 40 and discharge line 13. Line 13, and also line 11, may be standpipes similar to pipe 24 and also are preferably supplied with means similar to line 23 for supplying an aerating and/or stripping fluid. Preferably as large a fraction of solid particles is separated in separator 12 as possible, as the latter particles are at substantially higher temperature level than those withdrawn through line 13, but, as stated above, the limitations of maximum length of reaction time impose limitations on the use of primary separator 12.

The particles of solid contact material utilized are preferably of a refractory character adapted to be subjected to the elevated temperatures involved without being fused. In general, the various materials utilized in the production of high temperature refractories, such as Carborundrum, fire brick, magnesia, silica, bauxite, pumice, plumbago graphite, and the like, constitute suitable base materials for this purpose. Catalytic material of refractory character may be used. The contact material is preferably employed in finely divided or powdered condition in order to provide a high specific surface and consequent large amount of heat exchange surface. For example, the contact material utilized may consist largely or entirely of particles of 100 microns or smaller in average diameter. While the material utilized may suitably be catalytic with respect to the particular reaction involved, the process contemplates reactions wherein the contact material employed is non-catalytic and serves primarily as a heat carrier.

It will be apparent to those skilled in the art that such factors entering into the process as, (1) a temperature and quantity of the contact material introduced into the conversion zone, (2) the temperature of the conversion zone, (3) the time of contact in the conversion zone and consequent dimensions of the conversion zone, and (4) temperature of the cooling zone, will be dependent upon the particular reaction involved and the intermediate conversion product desired. Accordingly, these factors in any given instance are selected and regulated in accordance with the particular reaction involved and the products desired. The practice of the process, however, may be further exemplified by the following example of operating conditions suitable for the production of acetylene pursuant to the endothermic reaction represented by the following equation:

$$2CH_4 \rightarrow C_2H_2 + 3H_2 (-91,000 \text{ calories})$$

*Example*

|  | Lbs./Hr. | Temp., °F. |
|---|---|---|
| Feed (after preheater 27) | 24,320 | 1,000 |
| Particles of contact material (from standpipe 24) | 1,500,000 | 2,800 |
| Conversion zone conditions | 1,524,320 | 2,500 |
| Reaction time—0.01 second |  |  |
| Quenching zone |  | 800 |

Under the above conditions acetylene may be produced up to yields of approximately 50 per cent.

It is to be understood that the above example and conditions are merely illustrative and that the process may be applied to a wide variety of reactions requiring that a gaseous reactant be heated to an elevated temperature in a very short space of time and maintained at such a temperature for a very short space of time, for example a fraction of a second as above exemplified.

I claim:

1. The method of conducting an endothermic chemical reaction in the presence of a solid catalyst in powdered condition at a high temperature with a short contact time between reaction material and catalyst which comprises establishing an elevated reservoir of hot powdered catalyst, establishing a reaction zone at a substantially lower level, establishing a column of hot powdered catalyst in fluidized condition between said reservoir and said reaction zone, providing for a continuous open flow of catalyst from the bottom of said column into said reaction zone, admixing with catalyst leaving said column a gaseous reactant, causing said gaseous reactant to flow at a sufficiently high velocity to carry said hot powdered catalyst through said reaction zone concurrently with said reactant and at substantially the same velocity to where the catalyst with gaseous products of reaction are discharged from the reaction zone at its outlet, said velocity being preselected to provide the desired short contact time between catalyst and reactant, abruptly separating said powdered catalyst from gaseous products of reaction at the outlet of said reaction zone, quenching the products of reaction at the point of separation thereof from said catalyst and controlling the temperature of said reaction zone by controlling the temperature and the static head of said fluidized solids flowing from the bottom of said column into said reaction zone.

2. The method of conducting an endothermic chemical reaction in the presence of a solid catalyst in powdered condition at a high temperature with a short contact time between reaction material and catalyst which comprises establishing an elevated reservoir of hot powdered catalyst, establishing a reaction zone at a substantially lower level, establishing a column of hot powdered catalyst in fluidized condition between said reservoir and said reaction zone, providing for a continuous open flow of catalyst from the bottom of said column into said reaction zone, admixing with catalyst leaving said column a gaseous reactant, causing said gaseous reactant to flow at a sufficiently high velocity to carry said hot powdered catalyst through said reaction zone concurrently with said reactant and at substantially the same velocity to where the catalyst with gaseous products of the reaction are discharged from the reaction zone at its outlet; said velocity and the length of said reaction zone being preselected to provide the desired short contact time between catalyst and reactant, abruptly separating said powdered catalyst from gaseous products of reaction at the outlet of said reaction zone, flowing said gaseous products upwardly into a dense fluidized bed of catalyst at a temperature adapted to quench said reaction without condensing said gaseous products and controlling the temperature of said reaction zone by controlling the temperature and the flow of said fluidized solids from the bottom of said column into said reaction zone.

3. The method of conducting an endothermic chemical reaction in the presence of a solid catalyst in powdered condition at a high temperature with a short contact time between reaction material and catalyst which comprises establishing an elevated reservoir of hot powdered catalyst, establishing a reaction zone at a substantially lower level, establishing a column of hot powdered catalyst in fluidized condition between said reservoir and said reaction zone, providing for a continuous open flow of catalyst from the bottom of said column into said reaction zone, admixing with catalyst leaving said column a gaseous reactant, causing said gaseous reactant to flow at a sufficiently high velocity to carry said hot powdered catalyst through said reaction zone concurrently with said reactant and at substantially the same velocity to where the catalyst with gaseous products of the reaction are discharged from the reaction zone at its outlet, said velocity and the length of said reaction zone being preselected to provide the desired short contact time between catalyst and reactant, thereafter passing said catalyst and said gaseous products into the bottom portion of an enlarged zone to reduce the velocity of the gases passing upwardly through said enlarged zone sufficiently to cause the bulk of said catalyst to segregate into a relatively dense, fluidized layer in the bottom portion of said enlarged zone, maintaining said layer within said enlarged zone at a temperature materially below the desired reaction temperature to rapidly cool said reaction products and prevent secondary reactions, and controlling the temperature in said reaction zone by controlling the temperature and the flow of said fluidized solids from the bottom of said column into said reaction zone.

4. A method as described in claim 3 in which the volume of said fluidized mass of catalyst at quenching temperature is maintained in fluidized condition at least in part by the passage of reaction products upwardly therethrough and a portion of said fluidized particles are continuously withdrawn, cooled to a temperature below that of said reaction products, and reintroduced into said fluidized mass of catalyst, and the volume of said quenching mass is maintained relatively large in relation to the volume of reaction products passed into said mass for quenching.

5. A method as described in claim 4 in which said reaction products leave the reaction zone at temperatures above 2000° F. and said fluidized quenching mass is maintained at a temperature below 2000° F., and the volume of said quenching mass is maintained relatively large in relation to the volume of reaction products to cool said reaction products to a temperature below 2000° F.

6. The method of conducting an endothermic chemical reaction in the presence of a solid catalyst in powdered condition at a high temperature with a short contact time between reaction material and catalyst which comprises establishing an elevated reservoir of hot powdered catalyst, establishing a reaction zone at a substantially lower level, establishing a column of hot powdered catalyst in fluidized condition between said reservoir and said reaction zone, providing for a continuous open flow of catalyst from the bottom of said column into said reaction zone, admixing with catalyst leaving said column a gaseous reactant, causing said gaseous reactant to flow at a sufficiently high velocity to carry said hot powdered catalyst through said reaction zone concurrently with said reactant and at substantially the same velocity to where the catalyst with gaseous products of reaction are discharged from the reaction zone at its outlet, said velocity being preselected to provide the desired short contact time between catalyst and reactant, abruptly separating said powdered catalyst from gaseous products of reaction at the outlet of said reaction zone, quenching the products of reaction at the point of separation thereof from said catalyst and controlling the temperature of said reaction zone by controlling the temperature and the flow of said hot powdered catalyst flowing from the bottom of said column into said reaction zone.

References Cited in the file of this patent

UNITED STATES PATENTS

| Number | Name | Date |
|---|---|---|
| 1,773,611 | Banck | Aug. 30, 1930 |
| 2,303,047 | Hemminger | Nov. 24, 1942 |
| 2,325,516 | Holt et al. | July 27, 1943 |
| 2,376,190 | Roetheli et al. | May 15, 1945 |
| 2,396,109 | Martin | Mar. 5, 1946 |
| 2,437,334 | Roetheli | Mar. 9, 1948 |